United States Patent
Aihara et al.

(10) Patent No.: US 6,811,928 B2
(45) Date of Patent: Nov. 2, 2004

(54) BATTERY WITH ADHESION RESIN LAYER INCLUDING FILLER

(75) Inventors: Shigeru Aihara, Tokyo (JP); Daigo Takemura, Tokyo (JP); Hisashi Shiota, Tokyo (JP); Jun Aragane, Tokyo (JP); Hiroaki Urushibata, Tokyo (JP); Yasuhiro Yoshida, Tokyo (JP); Kouji Hamano, Tokyo (JP); Michio Murai, Tokyo (JP); Takayuki Inuzuka, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/381,295

(22) PCT Filed: Jan. 22, 1998

(86) PCT No.: PCT/JP98/00248

§ 371 (c)(1),
(2), (4) Date: Sep. 22, 1999

(87) PCT Pub. No.: WO99/38224

PCT Pub. Date: Jul. 28, 1999

(65) Prior Publication Data

US 2002/0055038 A1 May 9, 2002

(51) Int. Cl.⁷ ............................ H01M 6/18; H01M 2/16
(52) U.S. Cl. ..................... 429/316; 429/320; 429/144; 429/253; 29/623.1
(58) Field of Search ........................ 429/316, 320, 429/142, 144, 253; 29/623.1

(56) References Cited

U.S. PATENT DOCUMENTS

| | | | | |
|---|---|---|---|---|
| 5,429,891 A | * | 7/1995 | Gozdz et al. | |
| 5,437,692 A | * | 8/1995 | Dasgupta et al. | 29/623.1 |
| 5,512,389 A | * | 4/1996 | Dasgupta et al. | |
| 5,720,780 A | * | 2/1998 | Liu et al. | 29/623.1 |
| 5,948,464 A | * | 9/1999 | Delnick | 427/77 |
| 5,981,107 A | | 11/1999 | Hamano et al. | 429/231.95 |
| 6,096,456 A | * | 8/2000 | Takeuchi et al. | 429/249 |
| 6,124,061 A | * | 9/2000 | Hamano et al. | 429/316 |
| 6,156,458 A | * | 12/2000 | Brodd et al. | 429/317 |
| 6,287,720 B1 | * | 9/2001 | Yamashita et al. | 429/131 |
| 6,306,540 B1 | | 10/2001 | Hiroi et al. | |
| 6,322,599 B1 | | 11/2001 | Hamano et al. | |
| 6,395,428 B1 | * | 5/2002 | Kezuka | 429/300 |

FOREIGN PATENT DOCUMENTS

| | | | | |
|---|---|---|---|---|
| JP | 06-052891 | 2/1994 | | |
| WO | WO 98/59384 | * 12/1998 | ............ | H01M/2/16 |

* cited by examiner

*Primary Examiner*—Patrick Ryan
*Assistant Examiner*—Tracy Dove
(74) *Attorney, Agent, or Firm*—Oblon, Spivak, McClelland, Maier & Neustadt, P.C.

(57) ABSTRACT

Conventional batteries are disadvantageous in that a firm outer case must be used to maintain an electrical connection between electrodes, which has been an obstacle to size reduction. Those in which each electrode and a separator are joined with an adhesive resin suffer from conflict between adhesive strength and battery characteristics, particularly ion conductivity and internal resistivity. To solve these problems, it is an object of the invention to reduce resistance between electrodes, i.e., internal resistance of a battery to improve battery characteristics while securing both insulation function against electron conduction and ion conductivity between electrodes and also to maintain adhesive strength enough to firmly join the electrodes thereby to provide a light, compact and thin battery. The internal resistivity can be diminished by joining a positive electrode and a negative electrode with an adhesive resin layer having at least one adhesive resin layer containing a filler. The adhesive resin layer has pores, which are filled with an electrolytic solution to exhibit sufficient ion conductivity thereby to improve battery characteristics and to retain adhesive strength.

15 Claims, 5 Drawing Sheets

BATTERY WITH ADHESION RESIN LAYER INCLUDING FILLER

TECHNICAL FIELD

This invention relates to a battery and, more particularly, to a battery structure that realizes a light, compact and thin battery having a high discharging capacity at a high current density and satisfactory cycle characteristics.

BACKGROUND OF THE INVENTION

Batteries have been used long as a main power source or a backup power source for a variety of equipment. The demand for batteries has recently been increasing with the development of portable electronic equipment, such as cellular phones and portable personal computers. Primary batteries and secondary batteries are available according to use. As to secondary batteries having great convenience, high performance batteries such as lithium ion secondary batteries and nickel-hydrogen batteries have been attracting attention. The present invention will hereinafter be explained by referring to lithium ion secondary batteries the demand of which has been steeply increasing for use in portable electronic equipment.

Conventional lithium ion secondary batteries comprise a battery body that is a cylindrical roll of an electrode body or a stack of rectangular electrode bodies, the electrode body being composed of a positive electrode, a negative electrode, and a separator that is interposed between the two electrodes to serve for insulation and retention of an electrolyte. The battery body is put in a metal-made case so that the positive electrode, the negative electrode and the separator can be brought into intimate contact by the pressure of the case thereby to maintain the contact between each electrode and the separator.

An electrical contact can be maintained by putting the battery body in a metal-made case, but there is a problem that the case, being made of metal, increases the weight of the battery. Moreover, it is difficult to make a thin metal case. Difficulty in making a thin case has been a great obstacle to fulfillment of the demand for batteries to be used in compact portable equipment.

In this connection, U.S. Pat. No. 5,437,692 discloses a structure in which a lithium ion-conducting polymer is used as an ion conducting layer, and a positive electrode and a negative electrode are joined to the ion-conducting layer with an adhesive layer containing a lithium compound. The inventors of the present invention previously proposed in Japanese Patent Application No. 8-338240 a battery structure requiring no metal-made rigid case and a process for producing the same, in which a positive electrode and a negative electrode are previously joined to a separator with an adhesive resin.

The method comprising joining a positive and a negative electrode to a lithium ion-conducting polymer with an adhesive layer containing a lithium compound is disadvantageous in that the adhesive layer attains weak adhesion and becomes considerable resistance to ion conduction. The method comprising previously joining a positive and a negative electrode to a separator with an adhesive resin has made it feasible to maintain an electrical contact among them without imposing an external force but involves a problem that resistance between electrodes (i.e., a positive electrode and a negative electrode) increases because of the existence of not only the separator but the adhesive resin between the electrodes.

Direct bonding of electrodes is a conceivable method. In this case, it is necessary to secure both ion conduction and electron insulation between electrodes that ought to be undertaken by a conventional ion-conducting polymer or separator, and yet to join the electrodes firmly.

Further, the conventional ion-conducting polymer has weak adhesive strength, and the conventional adhesive resin joining electrodes and a separator has high adhesive strength but tends to deteriorate ion conductivity.

Where the conventional adhesive resin is used, it turned out that cases are met with in which a solution of the adhesive resin is absorbed by a porous electrode only to exhibit low adhesive strength or even fail to bond.

In addition, electrodes have their surfaces smoothed by pressing but still have unevenness of several microns to form vacancies where a separator and the electrodes are not in contact. The vacancies that should have been filled with an electrolyte may get starved of the electrolyte, which depends on the amount of the electrolyte supplied and the condition of use of the battery. Starvation of the electrolyte leads to an increase of internal resistivity of the battery and reductions in battery characteristics.

The present invention has been reached, aiming at settlement of the above-described problems. It is an object of the invention to provide a light, compact and thin battery in which a positive and a negative electrode are joined firmly to maintain the adhesive strength while securing both electron insulation and ion conduction between electrodes and decreasing resistance between electrodes, i.e., internal resistance of a battery, to improve battery characteristics.

DISCLOSURE OF THE INVENTION

A first battery according to the invention comprises a battery body having a positive and a negative electrode containing an active material, an electrolytic solution containing an electrolyte, and an adhesive resin layer which is interposed in between the positive electrode and the negative electrode and is joined to at least one of the positive and the negative electrodes, wherein the adhesive resin layer comprises at least one layer and contains fillers. In this structure, at least one of the positive electrode and the negative electrode is directly bonded to the adhesive resin layer, and the filler added makes the adhesive resin layer porous. The electrolyte and an adhesive resin solution can be held in the pores. As a result, internal resistivity of the battery can be reduced while maintaining adhesive strength to provide satisfactory battery characteristics.

A second battery according to the invention is the above-described first battery, wherein the electrolyte is an organic electrolyte containing lithium ions. This mode, when applied to lithium ion secondary batteries which are required to have reduced weight and thickness, provides a high performance compact battery.

A third battery according to the invention is the above-described first battery, wherein the average particle size of the filler is equal to or smaller than the particle size of the active material of the positive and negative electrodes. According to this mode, when the positive electrode and the negative electrode are joined with an adhesive resin, an adhesive resin solution having the adhesive resin dissolved in a solvent is hardly absorbed by the electrode active material so that it can be held as an adhesive resin layer to give necessary adhesive strength.

A fourth battery according to the invention is the above-described first battery, wherein the average particle size of the filler is 1 $\mu$m or smaller. According to this embodiment, the filler manifests a proper thickening effect for the adhesive resin solution to make the adhesive resin solution hardly absorbable by the active material thereby securing necessary adhesive strength. Further, the filler makes the adhesive resin layer porous to improve ion conductivity thereby providing satisfactory battery characteristics.

A fifth battery according to the invention is the above-described first battery, wherein the sum of a volume ratio of the adhesive resin and that of the filler per unit volume of the adhesive resin layer is less than 1. This mode secures the porosity of the formed adhesive resin layer thereby securing satisfactory ion conduction.

A sixth battery according to the invention is the above-described first battery, wherein the sum of a volume ratio of the adhesive resin and that of the filler per unit volume of the adhesive resin layer is 0.2 to 0.8. According to this embodiment, the voids of the porous adhesive resin are filled with the electrolyte to exhibit sufficient ion conductivity.

A seventh battery according to the invention is the above-described first battery, wherein the filler comprises at least one of non-conductive materials and semiconductors. According to this mode, the adhesive resin layer can be made porous to provide excellent battery characteristics including satisfactory ion conductivity while retaining adhesive strength.

An eighth battery according to the invention is the above-described first battery, wherein the adhesive resin layer comprises a layer containing an electrically conductive filler and a layer containing at least one of non-conductive fillers and semiconductive fillers. According to this embodiment, internal resistivity of the battery can further be diminished by the conductive filler-containing layer.

A ninth battery according to the invention is the above-described first battery, wherein the adhesive resin layer is constituted so as to fill the unevenness on the positive and the negative electrodes. This structure is effective in increasing the adhesive strength and preventing reduction of battery characteristics due to starvation of the electrolyte.

A tenth battery according to the invention is the above-described first battery, wherein the battery body is a laminate of a plurality of electrode bodies each composed of a single layer of the positive electrode, a single layer of the adhesive resin layer, and a single layer of the negative electrode.

An eleventh battery according to the invention is the above-described tenth battery, wherein the laminate is composed of the positive electrodes and the negative electrodes which are alternately interposed among a plurality of the adhesive resin layers.

A twelfth battery according to the invention is the above-described tenth battery, wherein the laminate is composed of the positive electrode and the negative electrode which are alternately interposed between adhesive resin layers and rolled up.

A thirteenth battery according to the invention is the above-described tenth battery, wherein the laminate is composed of the positive electrode and the negative electrode which are alternately interposed between adhesive resin layers and folded.

THE BEST MODE FOR CARRYING OUT THE INVENTION

The modes for carrying out the invention are hereinafter described by referring to the drawings.

The present invention consists in joining a positive electrode and a negative electrode directly with an adhesive resin layer so as to reduce internal resistivity of the battery. The positive and the negative electrodes are made up of fine particles of the respective active materials bound by a binder and molded and are porous. Where an adhesive resin is used to join the positive and the negative electrodes, ion conductivity is lessened to deteriorate battery characteristics according as the amount of the adhesive resin is increased for strengthening the adhesion. This is because the adhesive resin layer is formed in a film to block the passages for ion migration. Therefore, the problem ought to be solved only if the adhesive resin is not filmy but porous. In the present invention the adhesive resin layer can be made porous by incorporating a filler into the adhesive resin.

If an adhesive resin solution containing no filler is applied to an electrode (a positive and a negative electrode) for bonding, the adhesive resin solution will be absorbed by the electrode that is porous. Where a filler is mixed into the adhesive resin solution, the adhesive resin layer is provided with a porous structure formed by the filler. Since the adhesive resin solution is held in the pores of the porous structure and thereby prevented from being absorbed by the electrode, the adhesive resin solution can be maintained on the adhered surface. Further, this effect brings about an increase in viscosity of the adhesive resin solution to further improve adhesive resin holding properties.

The average particle size of the filler to be added is preferably not greater than that of the electrode active material, particularly 1 μm or smaller. Filler particles having an average particle size of 1 μm or greater form pores the diameter of which approximates the pore size of the electrode, and the ability of holding the electrolytic solution decreases. Where filler particles have an average particle size equal to or greater than the particle size of the electrode active material, the pores lose the ability of holding the electrolyte, resulting in reductions of battery characteristics. That is, the filler added produces no substantial effect. The sedimentation velocity of the filler particles in the adhesive resin solution increases with an increasing average particle size, which considerably deteriorates the handling properties of the adhesive resin solution. With the average particle size being 1 μm or smaller, the filler moderately increases the viscosity of the adhesive resin solution and makes the adhesive resin layer porous. The adhesive resin solution and the electrolytic solution can thus be held in the interface between electrodes.

The preference for the above-specified particle size of the filler applies to the particles constituting the most part of the filler. It does not matter if the filler contains particles out of that range.

Figure 1:
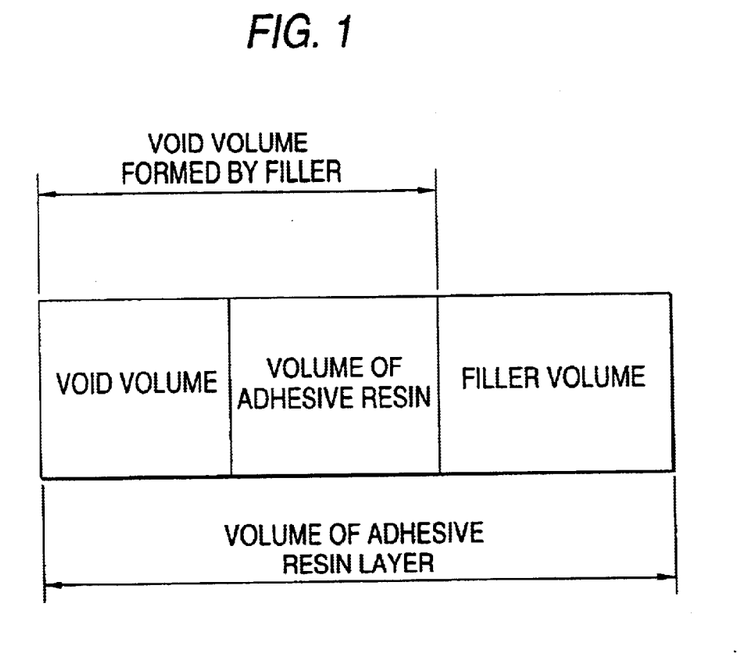
FIG. 1 is a diagram showing the volume ratio in the adhesive resin layer of the battery according to the invention.

An adhesive resin solution using a solution type adhesive resin is made up of a filler, an adhesive resin, and a solvent. Since the solvent is removed on drying, the resulting adhesive resin layer is composed of the filler, the adhesive resin, and the voids formed on solvent's drying. The constitution of the adhesive resin layer is illustrated in FIG. 1. As can be seen from FIG. 1, the void volume formed by the filler is made up of the volume of the adhesive resin and the volume of the voids formed on solvent's drying. If all the void volume formed by the filler is filled with the adhesive resin, the adhesive resin layer fails to retain its porosity and becomes an insulating layer. Hence, the sum of a volume ratio of the adhesive resin and that of the filler per unit volume of the adhesive resin layer should be less than 1.

In order for the adhesive resin layer to retain porosity, it is required as stated above that the sum of a volume ratio of the adhesive resin and that of the filler per unit volume of the adhesive resin layer be less than 1. On the other hand, in order for the voids of the porous adhesive resin to be filled with an electrolytic solution to exhibit sufficient ion conductivity, it is desirable for the adhesive resin layer to have a void volume of about 30%. From this standpoint, the sum of a volume ratio of the adhesive resin and that of the filler per unit volume of the adhesive resin layer should be 0.2 to 0.8. In other words the volume percentage of the voids based on the adhesive resin layer should be 20% to 80%.

The filler is not particularly limited in material as far as the above-specified average particle size can be realized. Inorganic substances such as oxides, e.g., $Al_2O_3$, $SiO_2$, $ZrO_2$, and $LiAlO_2$, carbides, e.g., SiC, $B_4C$, and ZrC, and nitrides, e.g., SiN, BN, and TiN, are stable in an electrolyte and, because they have low conductivity, there is no fear of a short circuit even where the filler-containing adhesive resin is present to connect the electrodes. Because polymers such as polyolefin resins and polymethyl methacrylate have not only low conductivity but a small specific gravity, they are effective in minimizing an increase of weight as compared with inorganic fillers or metallic fillers.

An inorganic salt, such as $LiPF_6$ or $LiClO_4$, that does not dissolve in an electrolytic solution or remains undissolved can serve as a filler to form fine pores. Even where the inorganic salt dissolves in an electrolytic solution, it leaves pores in the adhesive resin layer after dissolving, making it possible to increase the porosity of the adhesive resin layer.

Where a conductive filler, such as carbon or metal, is used, the adhesive resin layer is endowed with electrical conductivity. The adhesive resin layer thus having conductivity, electron conduction is not hindered even if the adhesive resin enters the interstices of an electrode. However, in case such a conductive material as carbon is used, the adhesive resin layer loses the function of insulation, requiring some manipulation for prevention of a short circuit between the electrodes. A short circuit can be prevented by, for example, joining the electrodes via a three-layered adhesive resin layer composed of a pair of adhesive resin layers containing a conductive filler and an adhesive resin layer containing an insulating filler interposed therebetween. A short circuit can also be prevented by joining the electrodes via a two-layered adhesive resin layer composed of a layer containing a conductive filler and a layer containing an insulating filler.

Figure 2:
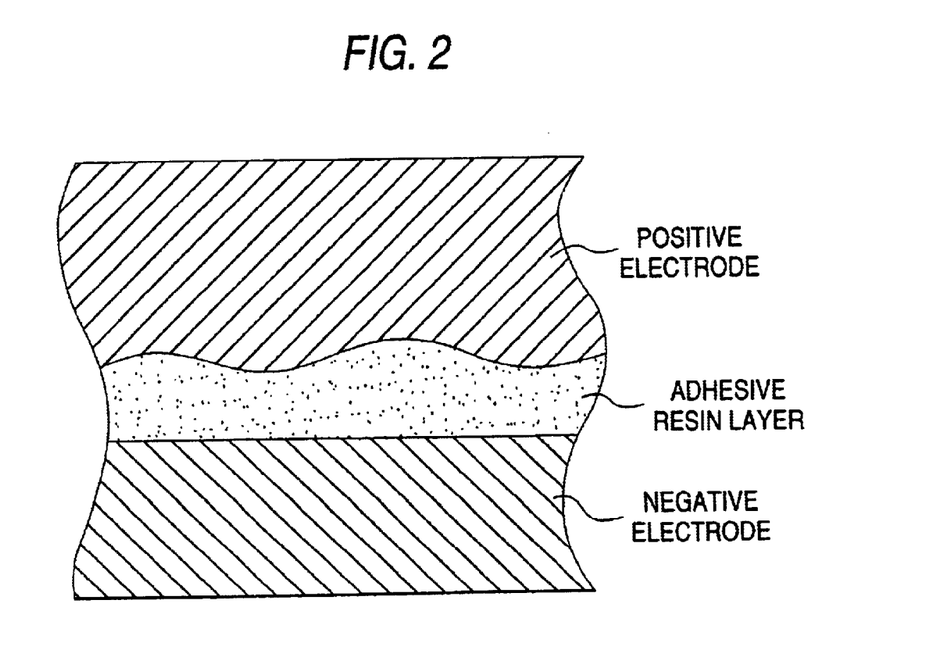
FIG. 2 is a schematic cross-sectional view showing the space formed in the interface between a positive electrode and a negative electrode in the battery according to the invention.

It is primarily required of the adhesive resin layer to have insulating properties against electron conduction between each electrode. In addition, where the filler-containing adhesive resin layer has such a form as to fill the space existing on the surface of each electrode due to the surface unevenness, the adhesive strength increases, and reduction in battery characteristics due to shortage of the electrolyte can be prevented. Because the surface of an electrode has a little unevenness on the order of several microns, it is desirable that the filler-containing adhesive resin be present so as to fill the gap as shown in FIG. 2. Supposing an allowable reduction in discharge capacity due to resistance of the adhesive resin layer is up to 50%, a desirable thickness of the adhesive resin layer is 200 $\mu$m or smaller. In order to minimize the reduction in discharge capacity, a more desirable thickness of the adhesive resin layer is 50 $\mu$m or smaller.

While the shape of the filler to be added to the adhesive resin is not particularly limited, it includes a spherical shape, an elliptical shape, a fibrous shape, and a flaky shape. A spherical filler will achieve an increased packing density, making the adhesive resin layer thinner. An elliptical, fibrous or flaky filler has an increased specific surface area to increase the void volume of the adhesive resin layer.

While the adhesive resin is not particularly limited in kind, materials which, when present in battery materials, are not corroded by an electrolytic solution containing an electrolyte or an electrode-forming material and are capable of retaining adhesiveness are preferred. In particular, adhesive resins of solution type are more effective, for the adhesive resin layer can easily be made porous. In lithium ion secondary batteries containing an organic electrolyte, fluorocarbon resins represented by polyvinylidene fluoride (PVDF) and polymers containing polyvinyl alcohol in the molecular structure thereof, represented by polyvinyl alcohol, are preferred.

While not limiting, the adhesive resin is preferably applied in a manner agreeable with a desired thickness and a coating form. Illustrative examples of coating methods include screen printing, bar coating, roll coating, gravure printing, and doctor blade coating.

The invention does not impose particular restriction on the structure of batteries to which the invention is applied. The invention is applicable to batteries having a battery body comprising a positive electrode, a negative electrode, and an adhesive resin layer interposed between the electrodes. Accordingly, the battery body can be an electrode body composed of a single positive electrode layer, a single adhesive resin layer, and a single negative electrode layer (hereinafter referred to as a unit electrode body) or a laminated battery body comprising a plurality of such unit electrode bodies. When the invention is applied to a battery having such a laminated battery body, there is provided a battery having high performance and a high battery capacity.

The laminated battery body can be formed by alternately superposing a plurality of positive electrodes and negative electrodes all cut in sizes via an adhesive resin layer or by rolling or folding one or more than one continuous sets of a positive electrode and a negative electrode to form a structure in which the positive electrode and the negative electrode alternate via an adhesive resin layer.

The present invention is especially effective when applied to lithium secondary batteries, which is not limiting the application of the invention. The invention is also applicable to primary batteries, such as lithium primary batteries, manganese-zinc batteries, and silver-zinc batteries; and other types of secondary batteries, such as nickel-cadmium batteries, nickel-zinc batteries, nickel-hydrogen batteries, polymer batteries, and carbon secondary batteries.

The details of the invention will now hereinafter be given by way of Examples, but the invention is by no means limited thereto.

EXAMPLE 1

Preparation of Electrode Body:

A positive electrode active material layer consisting of 91 parts by weight of $LiCoO_2$ having an average particle size of 10 $\mu$m (produced by Nippon Chemical Industrial Co., Ltd.), 6 parts by weight of graphite powder (produced by LONZA Ltd.), and 3 parts by weight of polyvinylidene fluoride (produced by Kureha Chemical Industry Co., Ltd.) was applied to an aluminum foil substrate to an average coating thickness of 80 $\mu$m to form a positive electrode. A negative electrode active material layer consisting of 90 parts by weight of mesophase microbeads (produced by Osaka Gas Co., Ltd.) having an average particle size of 8 $\mu$m and 10 parts by weight of polyvinylidene fluoride was applied to a copper substrate to an average coating thickness of 80 μm to form a negative electrode. An adhesive resin solution for joining these electrodes was prepared by dispersing and dissolving polyvinylidene fluoride (produced by Elf Atochem Japan) and alumina powder having an average particle size of 0.01 μm (produced by Degussa Corporation) in a concentration of 10 wt % each in N-methlpyrrolidone. The positive electrode and the negative electrode were cut in sizes of 50 mm×50 mm and 55 mm×55 mm, respectively. A cut piece of the negative electrode was coated with the adhesive resin solution on a screen printing machine using a 200 mesh screen and bonded to a cut piece of the positive electrode. The laminate was dried in a drier at 80° C. for 1 hour to prepare a unit electrode body. The thickness of the formed adhesive resin layer was controllable by choice of the mesh size. In this example, the thickness was 20 μm.

Evaluation of Electrode Body:

1) Measurement of Adhesive Strength (Peel Strength)

The adhesive strength between the negative electrode and the positive electrode of the resulting electrode body was measured by a peel test at 90°.

2) Measurement of Battery Characteristics

The resulting electrode body, with a current collecting tab spot-welded to the positive and the negative electrode thereof, was put in a bag made of an aluminum laminate sheet. An electrolytic solution was poured into the bag, and the opening of the bag was sealed to complete a battery. The battery was charged and discharged at 1 C, and a discharge capacity was measured as an indication of battery characteristics.

COMPARATIVE EXAMPLE 1

Electrodes were prepared, a battery was assembled, and evaluation was made in the same manner as in Example 1, except for using an adhesive resin solution prepared by dissolving polyvinylidene fluoride (PVDF) in N-methylpyrrolidone (NMP) in a concentration of 10 wt %.

EXAMPLE 2

Electrodes were prepared, a battery was assembled, and evaluation was made in the same manner as in Example 1, except for using an adhesive resin solution prepared by dissolving 2 wt % of polyvinyl alcohol and 5 wt % of alumina powder having an average particle size of 0.01 μm in N-methylpyrrolidone.

COMPARATIVE EXAMPLE 2

Electrodes were prepared, a battery was assembled, and evaluation was made in the same manner as in Example 2, except for using an adhesive resin solution prepared by dissolving 2 wt % of polyvinyl alcohol in N-methylpyrrolidone.

EXAMPLE 3

Electrodes were prepared, a battery was assembled, and evaluation was made in the same manner as in Example 1, except for using an adhesive resin solution prepared by dissolving and dispersing 10 wt % of polyvinylidene fluoride and 10 wt % of alumina powder having an average particle size of 0.1 μm in N-methylpyrrolidone.

EXAMPLE 4

Electrodes were prepared, a battery was assembled, and evaluation was made in the same manner as in Example 1, except for using an adhesive resin solution prepared by dissolving and dispersing 10 wt % of polyvinylidene fluoride and 10 wt % of alumina powder having an average particle size of 1 μm in N-methylpyrrolidone.

EXAMPLE 5

Electrodes were prepared, a battery was assembled, and evaluation was made in the same manner as in Example 1, except for using an adhesive resin solution prepared by dissolving and dispersing 10 wt % of polyvinylidene fluoride and 10 wt % of silica powder having an average particle size of 0.007 μm in N-methylpyrrolidone.

COMPARATIVE EXAMPLE 3

Electrodes were prepared, a battery was assembled, and evaluation was made in the same manner as in Example 1, except for using an adhesive resin solution prepared by dissolving and dispersing 10 wt % of polyvinylidene fluoride and 10 wt % of alumina powder having an average particle size of 10 μm in N-methylpyrrolidone.

EXAMPLE 6

Electrodes were prepared, a battery was assembled, and evaluation was made in the same manner as in Example 1, except for using an adhesive resin solution prepared by dissolving and dispersing 10 wt % of polyvinylidene fluoride and 5 wt % of alumina powder having an average particle size of 0.01 μm in N-methylpyrrolidone.

EXAMPLE 7

Electrodes were prepared, a battery was assembled, and evaluation was made in the same manner as in Example 1, except for using an adhesive resin solution prepared by dissolving and dispersing 5 wt % of polyvinylidene fluoride and 25 wt % of alumina powder having an average particle size of 0.01 μm in N-methylpyrrolidone.

COMPARATIVE EXAMPLE 4

Electrodes were prepared, a battery was assembled, and evaluation was made in the same manner as in Example 1, except for using an adhesive resin solution prepared by dissolving and dispersing 10 wt % of polyvinylidene fluoride and 1 wt % of alumina powder having an average particle size of 0.01 μm in N-methylpyrrolidone.

COMPARATIVE EXAMPLE 5

Electrodes were prepared, a battery was assembled, and evaluation was made in the same manner as in Example 1, except for using an adhesive resin solution prepared by dissolving and dispersing 3 wt % of polyvinylidene fluoride and 30 wt % of alumina powder having an average particle size of 0.01 μm in N-methylpyrrolidone.

EXAMPLE 8

Electrodes were prepared, a battery was assembled, and evaluation was made in the same manner as in Example 1, except for using an adhesive resin solution prepared by dissolving and dispersing 10 wt % of polyvinylidene fluoride and 10 wt % of alumina powder having an average particle size of 0.01 μm in N-methylpyrrolidone and using a 150 mesh screen for applying the adhesive resin solution (the thickness of the resulting adhesive resin layer was 50 μm)

EXAMPLE 9

Electrodes were prepared, a battery was assembled, and evaluation was made in the same manner as in Example 1, except for using an adhesive resin solution prepared by dissolving and dispersing 10 wt % of polyvinylidene fluoride and 10 wt % of alumina powder having an average particle size of 0.01 μm in N-methylpyrrolidone and using a 100 mesh screen for applying the adhesive resin solution (the thickness of the resulting adhesive resin layer was 100 μm).

EXAMPLE 10

Electrodes were prepared, a battery was assembled, and evaluation was made in the same manner as in Example 1, except for using an adhesive resin solution prepared by dissolving and dispersing 10 wt % of polyvinylidene fluoride and 10 wt % of alumina powder having an average particle size of 0.01 μm in N-methylpyrrolidone and using a 60 mesh screen for applying the adhesive resin solution (the thickness of the resulting adhesive resin layer was 150 μm).

EXAMPLE 11

Electrodes were prepared, a battery was assembled, and evaluation was made in the same manner as in Example 1, except for using an adhesive resin solution prepared by dissolving and dispersing 10 wt % of polyvinylidene fluoride and 10 wt % of alumina powder having an average particle size of 0.01 μm in N-methylpyrrolidone and using a 250 mesh screen for applying the adhesive resin solution (the thickness of the resulting adhesive resin layer was 10 μm).

EXAMPLE 12

Electrodes were prepared, a battery was assembled, and evaluation was made in the same manner as in Example 1, except for using an adhesive resin solution prepared by dissolving and dispersing 10 wt % of polyvinylidene fluoride and 10 wt % of alumina powder having an average particle size of 0.01 μm in N-methylpyrrolidone and using a 50 mesh screen for applying the adhesive resin solution (the thickness of the resulting adhesive resin layer was 200 μm).

EXAMPLE 13

Electrodes were prepared, a battery was assembled, and evaluation was made in the same manner as in Example 1, except for using an adhesive resin solution prepared by dissolving and dispersing 10 wt % of polyvinylidene fluoride and 10 wt % of silica powder having an average particle size of 0.01 μm (produced by Aerosil Co., Ltd.) in N-methylpyrrolidone.

EXAMPLE 14

Electrodes were prepared, a battery was assembled, and evaluation was made in the same manner as in Example 1, except for using an adhesive resin solution prepared by dissolving and dispersing 10 wt % of polyvinylidene fluoride and 30 wt % of silicon carbide powder having an average particle size of 0.5 μm (produced by Seimi Chemical Co., Ltd.) in N-methylpyrrolidone and using a 100 mesh screen in applying the adhesive resin solution.

EXAMPLE 15

Electrodes were prepared, a battery was assembled, and evaluation was made in the same manner as in Example 1, except for using an adhesive resin solution prepared by dissolving and dispersing 10 wt % of polyvinylidene fluoride and 30 wt % of boron carbide powder having an average particle size of 0.5 μm (produced by Seimi Chemical Co., Ltd.) in N-methylpyrrolidone.

EXAMPLE 16

Electrodes were prepared, a battery was assembled, and evaluation was made in the same manner as in Example 1, except for using an adhesive resin solution prepared by dissolving and dispersing 10 wt % of polyvinylidene fluoride and 30 wt % of silicon nitride powder having an average particle size of 0.5 μm (produced by Seimi Chemical Co., Ltd.) in N-methylpyrrolidone.

EXAMPLE 17

Electrodes were prepared, a battery was assembled, and evaluation was made in the same manner as in Example 1, except for using an adhesive resin solution prepared by dissolving and dispersing 10 wt % of polyvinylidene fluoride and 5 wt % of polymethyl methacrylate (PMMA) powder having an average particle size of 0.5 μm in N-methylpyrrolidone.

EXAMPLE 18

Electrodes were prepared, a battery was assembled, and evaluation was made in the same manner as in Example 1, except for using an adhesive resin solution prepared by dissolving and dispersing 10 wt % of polyvinylidene fluoride, 9 wt % of alumina powder having an average particle size of 0.01 μm, and 1 wt % of alumina powder having an average particle size of 1 μm in N-methylpyrrolidone.

EXAMPLE 19

Electrodes were prepared, a battery was assembled, and evaluation was made in the same manner as in Example 1, except for using an adhesive resin solution prepared by dissolving and dispersing 10 wt % of polyvinylidene fluoride, 5 wt % of alumina powder having an average particle size of 0.01 μm, and 5 wt % of silica powder having an average particle size of 0.01 μm in N-methylpyrrolidone.

EXAMPLE 20

Electrodes were prepared, a battery was assembled, and evaluation was made in the same manner as in Example 1, except for using an adhesive resin solution prepared by dissolving and dispersing 10 wt % of polyvinylidene fluoride, 9 wt % of alumina powder having an average particle size of 0.01 μm, and 1 wt % of silica powder having an average particle size of 0.5 μm in N-methylpyrrolidone.

EXAMPLE 21

Electrodes were prepared, a battery was assembled, and evaluation was made in the same manner as in Example 1, except for using an adhesive resin solution prepared by dissolving and dispersing 10 wt % of polyvinylidene fluoride, 9 wt % of alumina powder having an average particle size of 0.01 μm, and 1 wt % of polymethyl methacrylate powder having an average particle size of 0.5 μm in N-methylpyrrolidone.

EXAMPLE 22

Electrodes were prepared, a battery was assembled, and evaluation was made in the same manner as in Example 1, except for using an adhesive resin solution prepared by dissolving and dispersing 10 wt % of polyvinylidene fluoride, 9 wt % of alumina powder having an average particle size of 0.01 μm, and 1 wt % of silicon carbide having an average particle size of 0.5 μm in N-methylpyrrolidone.

EXAMPLE 23

Electrodes were prepared, a battery was assembled, and evaluation was made in the same manner as in Example 1, except for using an adhesive resin solution prepared by dissolving and dispersing 10 wt % of polyvinylidene fluoride, 5 wt % of silicon carbide powder having an average particle size of 0.5 µm, and 5 wt % of polymethyl methacrylate powder having an average particle size of 0.5 µm in N-methylpyrrolidone.

EXAMPLE 24

Electrodes were prepared, a battery was assembled, and evaluation was made in the same manner as in Example 1 except for the following. An adhesive resin solution prepared by dissolving and dispersing 10 wt % of polyvinylidene fluoride and 20 wt % of iron powder having an average particle size of 0.5 µm in N-methylpyrrolidone was applied to a side of each electrode on a screen printing machine using a 400 mesh screen and dried. An adhesive resin solution prepared by dissolving and dispersing 10 wt % of polyvinylidene fluoride and 10 wt % of alumina powder having an average particle size of 0.01 µm in N-methylpyrrolidone was applied to the previously coated side of the negative electrode on a screen printing machine using a 200 mesh screen. The previously coated side of the positive electrode was stuck thereto, and the laminate was dried.

EXAMPLE 25

Electrodes were prepared, a battery was assembled, and evaluation was made in the same manner as in Example 1 except for the following. An adhesive resin solution prepared by dissolving and dispersing 10 wt % of polyvinylidene fluoride and 50 wt % of carbon powder having an average particle size of 1 µm (produced by Osaka Gas Co., Ltd.) in N-methylpyrrolidone was applied to a side of each electrode on a screen printing machine using a 400 mesh screen and dried. An adhesive resin solution prepared by dissolving and dispersing 10 wt % of polyvinylidene fluoride and 10 wt % of alumina powder having an average particle size of 0.01 µm in N-methylpyrrolidone was applied to the previously coated side of the negative electrode on a screen printing machine using a 200 mesh screen, and the previously coated side of the positive electrode was stuck thereto, followed by drying.

EXAMPLE 26

Electrodes were prepared, a battery was assembled, and evaluation was made in the same manner as in Example 1 except for the following. An adhesive resin solution prepared by dissolving and dispersing 10 wt % of polyvinylidene fluoride and 20 wt % of iron powder having an average particle size of 1 µm in N-methylpyrrolidone was applied to a side of each electrode on a screen printing machine using a 400 mesh screen and dried. An adhesive resin solution prepared by dissolving and dispersing 10 wt % of polyvinylidene fluoride and 30 wt % of silicon carbide powder having an average particle size of 0.5 µm in N-methylpyrrolidone was applied to the previously coated side of the negative electrode on a screen printing machine using a 200 mesh screen. The previously coated side of the positive electrode was stuck thereto, and the resulting laminate was dried. Electrodes were prepared, a battery was assembled, and evaluation was made in the same manner as in Example 1 except for using an adhesive resin solution prepared by dissolving and dispersing 10 wt % of polyvinylidene fluoride, 9 wt % of alumina powder having an average particle size of 0.01 µm, and 1 wt % of iron powder having an average particle size of 0.5 µm in N-methylpyrrolidone.

EXAMPLE 27

Electrodes were prepared, a battery was assembled, and evaluation was made in the same manner as in Example 1 except for the following. An adhesive resin solution prepared by dissolving and dispersing 10 wt % of polyvinylidene fluoride and 50 wt % of carbon powder having an average particle size of 1 µm in N-methylpyrrolidone was applied to a side of each electrode on a screen printing machine using a 400 mesh screen and dried. An adhesive resin solution prepared by dissolving and dispersing 10 wt % of polyvinylidene fluoride and 30 wt % of silicon carbide powder having an average particle size of 0.5 µm in N-methylpyrrolidone was applied to the previously coated side of the negative electrode on a screen printing machine using a 200 mesh screen. The previously coated side of the positive electrode was stuck thereto, and the resulting laminate was dried.

EXAMPLE 28

Electrodes were prepared, a battery was assembled, and evaluation was made in the same manner as in Example 1 except for the following. An adhesive resin solution prepared by dissolving and dispersing 10 wt % of polyvinylidene fluoride and 20 wt % of iron powder having an average particle size of 1 µm in N-methylpyrrolidone was applied to a side of each electrode on a screen printing machine using a 400 mesh screen and dried. An adhesive resin solution prepared by dissolving and dispersing 10 wt % of polyvinylidene fluoride and 5 wt % of polymethyl methacrylate powder having an average particle size of 0.5 µm in N-methylpyrrolidone was applied to the previously coated side of the negative electrode on a screen printing machine using a 200 mesh screen. The previously coated side of the positive electrode was stuck thereto, and the resulting laminate was dried.

EXAMPLE 29

Electrodes were prepared, a battery was assembled, and evaluation was made in the same manner as in Example 1 except for the following. An adhesive resin solution prepared by dissolving and dispersing 10 wt % of polyvinylidene fluoride and 50 wt % of carbon powder having an average particle size of 1 µm in N-methylpyrrolidone was applied to a side of each electrode on a screen printing machine using a 400 mesh screen and dried. An adhesive resin solution prepared by dissolving and dispersing 10 wt % of polyvinylidene fluoride and 5 wt % of polymethyl methacrylate powder having an average particle size of 0.5 µm in N-methylpyrrolidone was applied to the previously coated side of the negative electrode on a screen printing machine using a 200 mesh screen. The previously coated side of the positive electrode was stuck thereto, and the resulting laminate was dried.

EXAMPLE 30

A positive electrode, a negative electrode, and an adhesive resin solution were prepared in the same manner as in Example 1. The positive electrode and the negative electrode were cut in pieces of 50 mm×50 mm and 55 mm×55 mm, respectively. The adhesive resin solution was applied to a side of a cut piece of the negative electrode on a screen printing machine, and a cut piece of the positive electrode was stuck thereto. Then, a side of another piece of the negative electrode was coated with the adhesive resin solution and bonded to the previously bonded positive electrode. These steps were repeated 6 times to build up a laminated battery body. The battery body was dried while applying pressure to obtain a tabular laminated battery body having positive and negative electrodes alternately bonded via an adhesive resin layer. The battery characteristics of the resulting battery body were evaluated in the same manner as in Example 1.

EXAMPLE 31

A positive electrode, a negative electrode, and an adhesive resin solution were prepared in the same manner as in Example 1. The positive electrode and the negative electrode were cut in pieces of 50 mm×50 mm and 55 mm×55 mm, respectively. The adhesive resin solution was applied to a side of a cut piece of the positive electrode on a screen printing machine, and a cut piece of the negative electrode was stuck thereto. Then, a side of another piece of the positive electrode was coated with the adhesive resin solution and bonded to the previously bonded negative electrode. These steps were repeated 6 times to build up a laminated battery body. The battery body was dried while applying pressure to obtain a tabular laminated battery body having positive and negative electrodes alternately bonded with an adhesive resin layer. The battery characteristics of the resulting battery body were evaluated in the same manner as in Example 1.

EXAMPLE 32

A positive electrode, a negative electrode, and an adhesive resin solution were prepared in the same manner as in Example 1. A band of 300 mm×50 mm and of 305 mm×55 mm was cut out of the positive electrode and the negative electrode, respectively. The adhesive resin solution was applied to a side of the negative electrode band on a screen printing machine. One end of the coated negative electrode was folded back at a prescribed length. The positive electrode band was inserted into the center of the fold, and the folded end was sent to a laminator. Subsequently, the positive electrode and the negative electrode were superposed and passed through the laminator. The laminate was rolled up into an oblong cylinder while applying the adhesive resin solution to the other side of the negative electrode that was opposite to the side previously coated with the adhesive resin solution.

The rolled oblong battery body was dried while applying pressure to obtain a tabular roll type battery body having positive and negative electrodes bonded alternately via an adhesive resin layer. The battery characteristics of the resulting battery body were evaluated in the same manner as in Example 1.

EXAMPLE 33

A positive electrode, a negative electrode, and an adhesive resin solution were prepared in the same manner as in Example 1. A band of 300 mm×50 mm and of 305 mm×55 mm was cut out of the positive electrode and the negative electrode, respectively. The adhesive resin solution was applied to a side of the positive electrode on a screen printing machine. One end of the coated positive electrode was folded back at a prescribed length. The negative electrode band was inserted into the center of the fold. Subsequently, the folded positive electrode and the negative electrode were superposed and passed through the laminator. The adhesive resin solution was applied to the other side of the positive electrode that was opposite to the side previously coated with the adhesive resin solution, and the laminate was rolled up into an oblong cylinder.

The rolled oblong battery body was dried while applying pressure to obtain a tabular roll type battery body having positive and negative electrodes bonded alternately via an adhesive resin layer. The battery characteristics of the resulting battery body were evaluated in the same manner as in Example 1.

EXAMPLE 34

A positive electrode, a negative electrode, and an adhesive resin solution were prepared in the same manner as in Example 1. A piece of 50 mm×50 mm and of 55 mm×55 mm was cut out of the positive electrode and the negative electrode, respectively. The adhesive resin solution was applied to a side of the negative electrode by means of a roll coater the nip of which was adjusted to give a coating thickness substantially equal to that in Example 1. The negative electrode and the positive electrode were joined and dried in a drier at 80° C. for 1 hour to obtain a battery body comprising a unit electrode body having the positive electrode and the negative electrode bonded together. The battery characteristics of the resulting battery body were evaluated in the same manner as in Example 1.

EXAMPLE 35

A positive electrode, a negative electrode, and an adhesive resin solution were prepared in the same manner as in Example 1. A piece of 50 mm×50 mm and of 55 mm×55 mm was cut out of the positive electrode and the negative electrode, respectively. The adhesive resin solution was applied to a side of the negative electrode by means of a gravure printing machine the nip of which was adjusted to give a coating thickness substantially equal to that in Example 1. The negative electrode and the positive electrode were joined and dried in a drier at 80° C. for 1 hour to obtain a battery body comprising a unit electrode body having the positive electrode and the negative electrode bonded together. The battery characteristics of the resulting battery body were evaluated in the same manner as in Example 1.

EXAMPLE 36

A positive electrode, a negative electrode, and an adhesive resin solution were prepared in the same manner as in Example 1. A piece of 50 mm×50 mm and of 55 mm×55 mm was cut out of the positive electrode and the negative electrode, respectively. The adhesive resin solution was applied to a side of the negative electrode by means of a doctor blade coater the gap of which was adjusted to give a coating thickness substantially equal to that in Example 1. The negative electrode and the positive electrode were joined and dried in a drier at 80° C. for 1 hour to obtain a battery body comprising a unit electrode body having the positive electrode and the negative electrode bonded together. The battery characteristics of the resulting battery body were evaluated in the same manner as in Example 1.

EXAMPLE 37

A positive electrode, a negative electrode, and an adhesive resin solution were prepared in the same manner as in Example 1. A piece of 50 mm×50 mm and of 55 mm×55 mm was cut out of the positive electrode and the negative electrode, respectively. The adhesive resin solution was applied to a side of the negative electrode by means of a bar coater the gap of which was adjusted to give a coating thickness substantially equal to that in Example 1. The negative electrode and the positive electrode were joined and dried in a drier at 80° C. for 1 hour to obtain a battery body comprising a unit electrode body having the positive electrode and the negative electrode bonded together. The battery characteristics of the resulting battery body were evaluated in the same manner as in Example 1.

Figure 3:
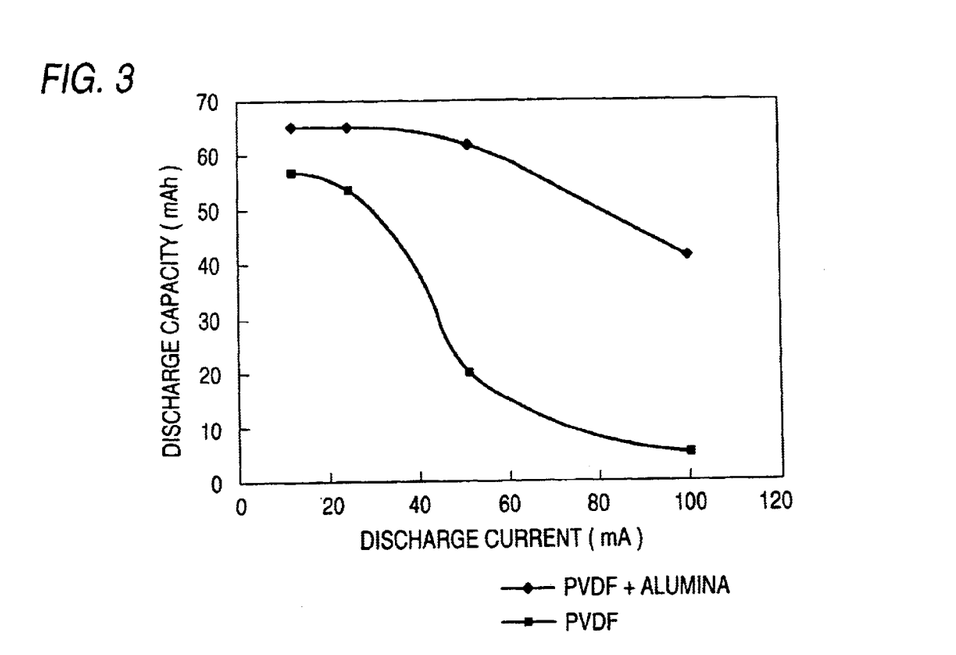
FIG. 3 is a graph showing the change in discharge capacity brought about by addition of an alumina filler to a PVDF resin.
Figure 4:
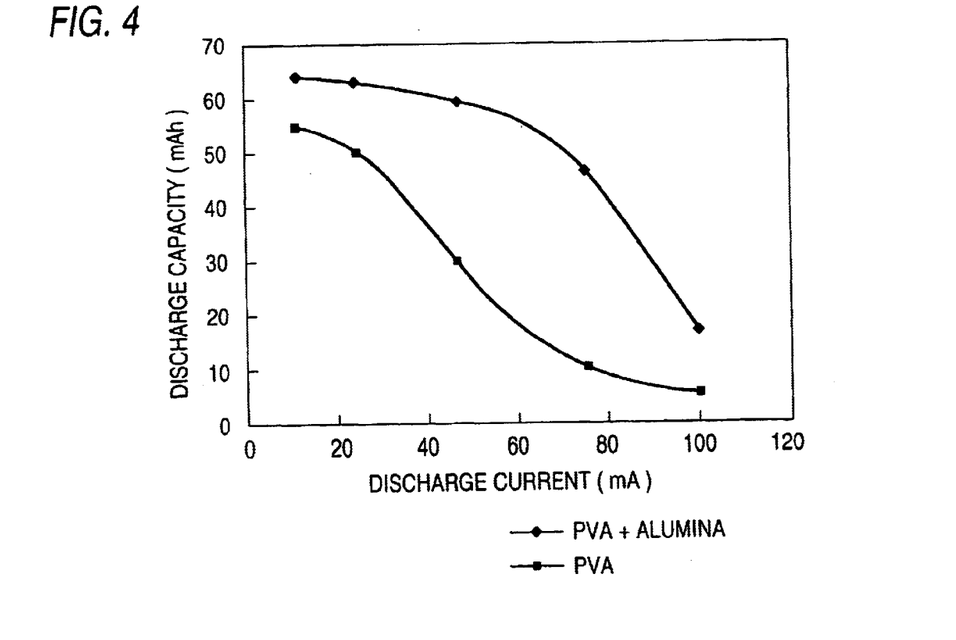
FIG. 4 is a graph showing the change in discharge capacity caused by addition of an alumina filler to a PVA resin.

The adhesive strength of the prepared electrodes and the discharge capacity in charging and discharging the prepared batteries at 1 C are shown in Tables 1 through 9. The graphs of discharge capacity vs. charging and discharging current with different adhesive resins are shown in FIGS. 3 and 4.

Comparisons between Example 1 and Comparative Example 1 and between Example 2 and Comparative Example 2 reveal that addition of a filler to an adhesive resin solution brings about improvement in discharge capacity, especially under a high load.

TABLE 1

| | Adhesive | | | | |
| --- | --- | --- | --- | --- | --- |
| | Resin | Filler | Weight Ratio | Particle Size of Filler (μm) | Peel Strength (gf/cm) | Discharge Capacity (1C) (mAh) |
| Example 1 | PVDF | alumina | 1:1 | 0.01 | 50 | 60 |
| Compara. Example 1 | PVDF | none | — | — | 100 | 20 |
| Example 2 | PVA | alumina | 2:5 | 0.01 | 70 | 60 |
| Compara. Example 2 | PVA | none | — | — | 100 | 30 |

Table 2 shows the results obtained with the average particle size of an alumina filler varied and the results obtained with a silica filler having a smaller particle size. These results are graphed in FIG. 5, in which the peel strength and the discharge capacity are plotted against the particle size of the alumina filler added. It can be seen that the peel strength somewhat decreases at a particle size of 1 μm or smaller, which was not problematical for practical use. It is also seen that, on the other hand, the discharge capacity tends to decrease as the average particle size becomes greater than 1 μm because of reduction of void volume in the adhesive resin layer.

TABLE 2

| | Adhesive | | | | |
| --- | --- | --- | --- | --- | --- |
| | Resin | Filler | Weight Ratio | Particle Size of Filler (μm) | Peel Strength (gf/cm) | Discharge Capacity (1C) (mAh) |
| Example 1 | PVDF | alumina | 1:1 | 0.01 | 50 | 60 |
| Example 3 | PVDF | alumina | 1:1 | 0.1 | 60 | 55 |
| Example 4 | PVDF | alumina | 1:1 | 1 | 65 | 50 |
| Example 5 | PVDF | silica | 1:1 | 0.007 | 45 | 60 |
| Compara. Example 3 | PVDF | alumina | 1:1 | 10 | 60 | 25 |

Figure 6:
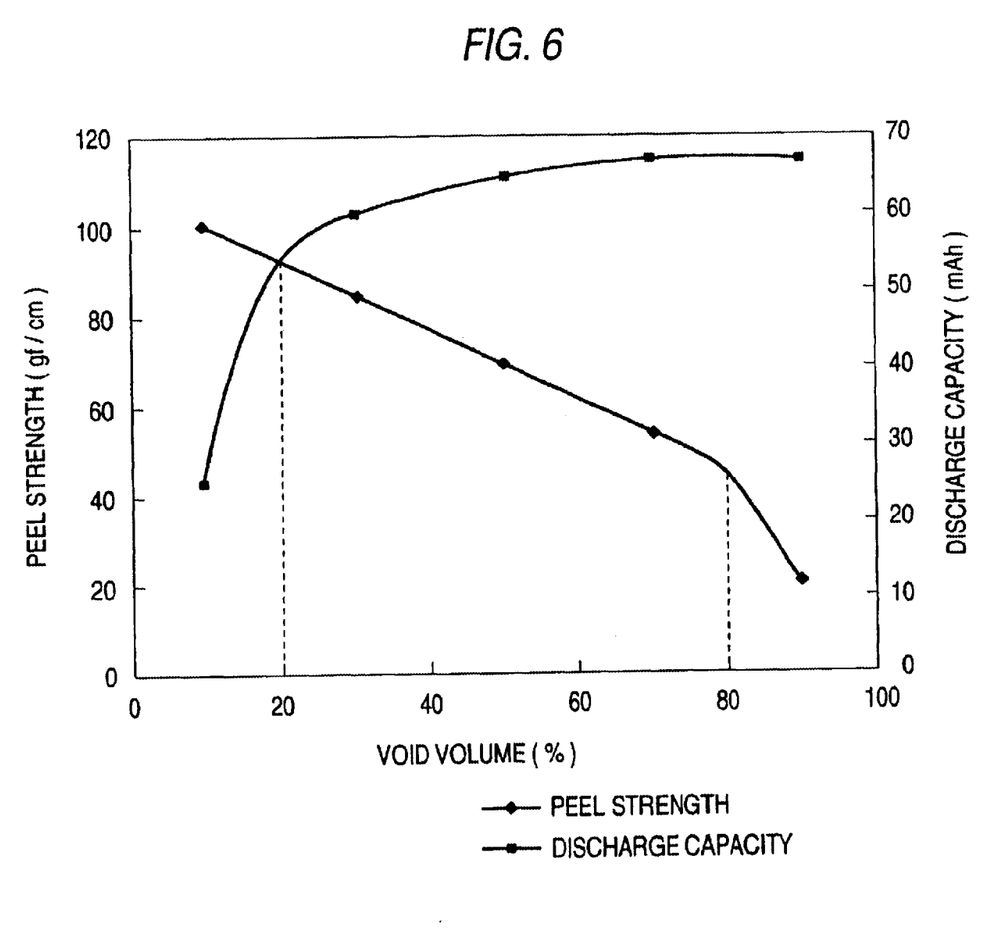
FIG. 6 is a graph showing the relationship between peel strength and discharge capacity against volume percentage of the voids of an adhesive resin layer.

Table 3 shows the results obtained when the ratio of the alumina filler to the adhesive resin was varied. These results are graphed in FIG. 6, in which the peel strength and the battery capacity are plotted against volume percentage of the voids. The proportion of the adhesive resin in the void volume formed by the filler changes with a change of the filler to resin ratio, and a change of the void volume in the adhesive resin layer follows. If the volume percentage of the voids is 20% or less, passages for ions through the adhesive resin layer are diminished, resulting in an obvious reduction in discharge capacity. On the other hand, the adhesive strength tends to reduce with an increase of volume percentage of the voids. If the volume percentage of the voids is 80% or more, the amount of the filler is so large that the amount of the adhesive resin is insufficient, resulting in an extreme reduction in adhesive strength.

Figure 7:
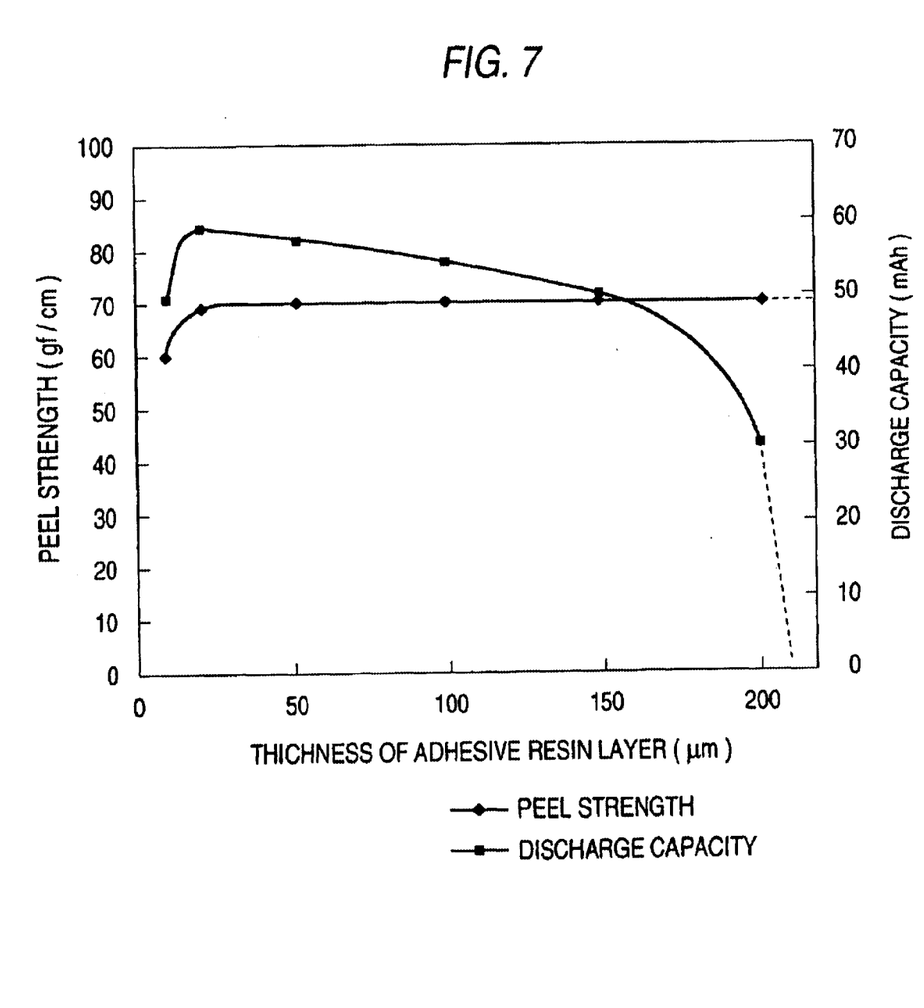
FIG. 7 is a graph showing the relationship between peel strength and discharge capacity against thickness of an adhesive resin layer.

Table 4 shows the results obtained when the thickness of the adhesive resin layer was varied. The peel strength and the discharge capacity are plotted against the thickness in FIG. 7. As can be seen, with a coating thickness of 50 μm or smaller, the adhesive resin layer does not cause hindrance to ion conduction while filling the gap formed by the unevenness of the electrodes so that a high discharge capacity can be secured. If the thickness exceeds 50 μm, the passages for ions are so long that they become resistance and cause gradual reduction of discharge capacity. If the thickness of the adhesive resin layer is increased to about 200 μm, the rate of reduction in discharge capacity is as high as about 50%.

TABLE 3

| | Adhesive | | | | Volume of Solid Matter (%) | Void Volume (%) | Peel Strength (gf/cm) | Discharge Capacity (1C) (mAh) |
| --- | --- | --- | --- | --- | --- | --- | --- | --- |
| | Resin | Filler | Weight Ratio | Particle Size of Filler (μm) | | | | |
| Example 1 | PVDF | alumina | 1:1 | 0.01 | 50 | 50 | 70 | 62 |
| Example 6 | PVDF | alumina | 2:1 | 0.01 | 70 | 30 | 85 | 58 |
| Example 7 | PVDF | alumina | 1:5 | 0.01 | 30 | 70 | 60 | 65 |
| Compara. Example 4 | PVDF | alumina | 10:1 | 0.01 | 90 | 10 | 100 | 20 |
| Compara. Example 5 | PVDF | alumina | 1:10 | 0.01 | 10 | 90 | 20 | 65 |

TABLE 4

| | Adhesive | | | | Thickness (μm) | Peel Strength (gf/cm) | Discharge Capacity (1C) (mAh) |
| --- | --- | --- | --- | --- | --- | --- | --- |
| | Resin | Filler | Weight Ratio | Particle Size of Filler (μm) | | | |
| Example 1 | PVDF | alumina | 1:1 | 0.01 | 20 | 70 | 60 |
| Example 8 | PVDF | alumina | 1:1 | 0.01 | 50 | 70 | 58 |
| Example 9 | PVDF | alumina | 1:1 | 0.01 | 100 | 70 | 55 |

TABLE 4-continued

|  | Adhesive | | | | Thickness (μm) | Peel Strength (gf/cm) | Discharge Capacity (1C) (mAh) |
| --- | --- | --- | --- | --- | --- | --- | --- |
|  | Resin | Filler | Weight Ratio | Particle Size of Filler (μm) | | | |
| Example 10 | PVDF | alumina | 1:1 | 0.01 | 150 | 70 | 50 |
| Example 11 | PVDF | alumina | 1:1 | 0.01 | 10 | 60 | 60 |
| Example 12 | PVDF | alumina | 1:1 | 0.01 | 200 | 70 | 30 |

Figure 5:
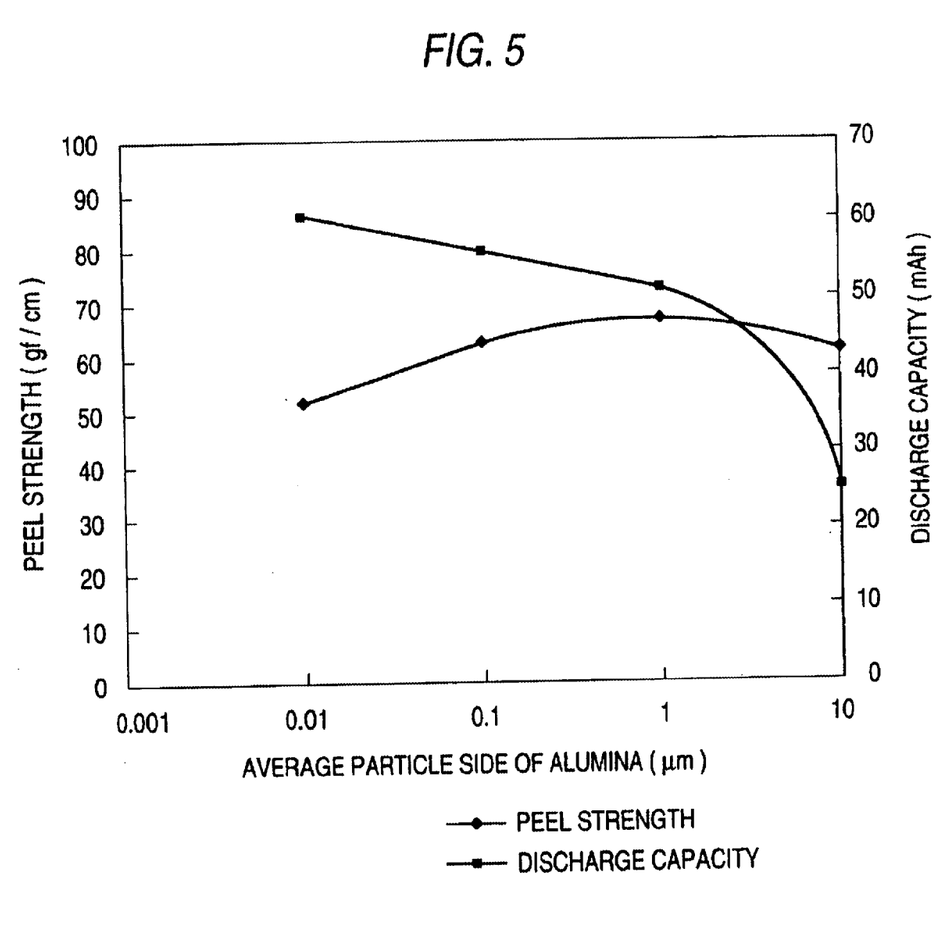
FIG. 5 is a graph showing the relationship between peel strength and discharge capacity with an alumina filler added having a varied average particle size.

FIG. 5 shows the results obtained from different kinds of fillers. It was proved that various fillers produce similar effects. In particular, great effects are obtained with inorganic compounds and polymers.

TABLE 5

|  | Adhesive | | | | Peel Strength (gf/cm) | Discharge Capacity (1C) (mAh) |
| --- | --- | --- | --- | --- | --- | --- |
|  | Resin | Filler | Weight Ratio | Particle Size of Filler (μm) | | |
| Example 1 | PVDF | alumina | 1:1 | 0.01 | 50 | 60 |
| Example 13 | PVDF | silica | 1:1 | 0.01 | 50 | 60 |
| Example 14 | PVDF | silicon carbide | 1:3 | 0.5 | 80 | 50 |
| Example 15 | PVDF | boron carbide | 1:3 | 0.5 | 80 | 50 |
| Example 16 | PVDF | silicon nitride | 1:3 | 0.5 | 80 | 50 |
| Example 17 | PVDF | PMMA | 2:1 | 0.5 | 80 | 50 |

Table 6 shows the results obtained when two kinds of fillers were used in combination. It is seen that similar effects are produced when fillers are used in various combinations. It is understood, in particular, that materials that contain no conducive materials show great effects.

TABLE 6

|  | Adhesive | | | | | | | | |
| --- | --- | --- | --- | --- | --- | --- | --- | --- | --- |
|  | Resin | | Filler 1 | | | Filler 2 | | | |
|  | Kind | Weight Ratio | Kind | Weight Ratio | Particle Size of Filler (μm) | Kind | Weight Ratio | Particle Size of Filler (μm) | Peel Strength (gf/cm) | Discharge Capacity (1C) (mAh) |
| Example 1 | PVDF | 1 | alumina | 1 | 0.01 | none | 0 | 0 | 50 | 60 |
| Example 18 | PVDF | 1 | alumina | 0.9 | 0.01 | alumina | 0.1 | 1 | 55 | 55 |
| Example 19 | PVDF | 1 | alumina | 0.5 | 0.01 | silica | 0.5 | 0.01 | 50 | 60 |
| Example 20 | PVDF | 1 | alumina | 0.9 | 0.01 | silica | 0.1 | 0.5 | 55 | 55 |
| Example 21 | PVDF | 1 | alumina | 0.9 | 0.01 | PMMA | 0.1 | 0.5 | 55 | 55 |
| Example 22 | PVDF | 1 | alumina | 0.9 | 0.01 | silicon carbide | 0.1 | 0.5 | 55 | 55 |
| Example 23 | PVDF | 1 | silicon carbide | 0.5 | 0.5 | PMMA | 0.5 | 0.5 | 80 | 55 |

Table 7 shows the results obtained in case where the adhesive resin layer provided had a three layer structure having an insulating filler-containing adhesive resin layer (intermediate layer) between conductive filler-containing adhesive resin layers (electrode surface layers). It is understood that similar effects are obtained from various combinations of a conductive filler and an insulating filler.

TABLE 7

| | Adhesive | | | | | | | | | | |
|---|---|---|---|---|---|---|---|---|---|---|---|
| | Adhesive Resin Layer (Intermediate Layer) | | | | Adhesive Resin Layer (Electrode Surface Layer) | | | | | | |
| | Adhesive Resin | | Filler | | Adhesive Resin | | Filler | | | | Discharge |
| | Kind | Weight Ratio | Kind | Weight Ratio | Particle Size of Filler ($\mu$m) | Kind | Weight Ratio | Kind | Weight Ratio | Particle Size of Filler ($\mu$m) | Peel Strength (gf/cm) | Capacity (1C) (mAh) |
| Example 1 | PVDF | 1 | alumina | 1 | 0.01 | none | — | — | — | — | 50 | 60 |
| Example 24 | PVDF | 1 | alumina | 1 | 0.01 | PVDF | 1 | iron | 2 | 0.5 | 55 | 50 |
| Example 25 | PVDF | 1 | alumina | 1 | 0.01 | PVDF | 1 | carbon | 5 | 1 | 55 | 50 |
| Example 26 | PVDF | 1 | silicon carbide | 3 | 0.5 | PVDF | 1 | iron | 2 | 0.5 | 80 | 45 |
| Example 27 | PVDF | 1 | silicon carbide | 3 | 0.5 | PVDF | 1 | carbon | 5 | 1 | 80 | 45 |
| Example 28 | PVDF | 1 | PMMA | 0.5 | 0.5 | PVDF | 1 | iron | 2 | 0.5 | 80 | 45 |
| Example 29 | PVDF | 1 | PMMA | 0.5 | 0.5 | PVDF | 1 | carbon | 5 | 1 | 80 | 45 |

Table 8 shows the results of testing on battery characteristics of various battery structures. It proves that satisfactory battery characteristics can be obtained irrespective of the battery structure.

TABLE 8

| | Adhesive | | | | | |
|---|---|---|---|---|---|---|
| | Resin | Filler | Weight Ratio | Particle Size of Filler ($\mu$m) | Battery Structure | Discharge Capacity (1C) (mAh) |
| Example 1 | PVDF | alumina | 1:1 | 0.01 | tabular unit electrode body | 60 |
| Example 30 | PVDF | alumina | 1:1 | 0.01 | tabular laminated electrode body | 360 |
| Example 31 | PVDF | alumina | 1:1 | 0.01 | tabular laminated electrode body | 360 |
| Example 32 | PVDF | alumina | 1:1 | 0.01 | tabular rolled electrode body | 360 |
| Example 33 | PVDF | alumina | 1:1 | 0.01 | tabular rolled electrode body | 360 |

Table 9 shows the results of testing on battery characteristics obtained when the method for applying the adhesive resin solution was altered. As shown in Table 9, satisfactory battery characteristics can be obtained irrespective of the application method as long as the coating thickness is substantially equal.

TABLE 9

| | Adhesive | | | | | |
|---|---|---|---|---|---|---|
| | Resin | Filler | Weight Ratio | Particle Size of Filler ($\mu$m) | Battery Structure | Discharge Capacity (1C) (mAh) |
| Example 1 | PVDF | alumina | 1:1 | 0.01 | screen printing | 60 |

TABLE 9-continued

| | Adhesive | | | | | |
|---|---|---|---|---|---|---|
| | Resin | Filler | Weight Ratio | Particle Size of Filler ($\mu$m) | Battery Structure | Discharge Capacity (1C) (mAh) |
| Example 34 | PVDF | alumina | 1:1 | 0.01 | roll coater | 60 |
| Example 35 | PVDF | alumina | 1:1 | 0.01 | gravure printing | 60 |
| Example 36 | PVDF | alumina | 1:1 | 0.01 | doctor blade | 60 |
| Example 37 | PVDF | alumina | 1:1 | 0.01 | bar coater | 60 |

Industrial Applicability

The battery according to the invention is used as a secondary battery, etc. in portable electronic equipment and has reduced size and weight as well as improved battery performance.

What is claimed is:

1. A battery comprising a battery body including:
   a positive electrode and a negative electrode each containing an active material, where the positive electrode and the negative electrode each has an uneven surface defining a space;
   an electrolytic solution containing an electrolyte; and
   an adhesive resin layer which is interposed in between the positive electrode and the negative electrode and is joined directly to both the positive electrode and the negative electrode, wherein
   the adhesive resin layer consists of one layer and contains an adhesive resin and a filler, where the adhesive resin comprises a polymer selected from the group consisting of polyvinylidene fluoride homopolymer and polyvinyl alcohol;
   the adhesive resin layer fills the space defined by the uneven surface of the positive electrode and the space defined by the uneven surface of the negative electrode;
   a weight ratio of the adhesive resin to the filler is not less than 1/5 and not more than 2;
   an average particle size of the filler is equal to or smaller than a particle size of the active material constituting each electrode: and the adhesive resin layer is connected to the positive electrode and the negative electrode at a predetermined peel strength in a range of from 50 gf/cm to 85 gf/cm.

2. A battery according to claim 1, wherein the electrolyte is an organic electrolyte containing lithium ions.

3. A battery according to claim 1, wherein the sum of a volume ratio of the adhesive resin and that of the filler per unit volume of the adhesive resin layer is less than 1.

4. A battery according to claim 1, wherein the sum of a volume ratio of the adhesive resin and that of the filler per unit volume of the adhesive resin layer is 0.2 to 0.8.

5. A battery according to claim 1, wherein the filler comprises at least one of non-conductive materials and semiconductors.

6. A battery comprising a battery body including:
   a positive and a negative electrode containing an active material,
   an electrolytic solution containing an electrolyte, and
   an adhesive resin layer which is interposed in between the positive electrode and the negative electrode and is joined directly to both of the positive and the negative electrodes, wherein
   the adhesive resin layer comprises at least one layer and contains fillers; and
   the adhesive resin layer comprises a layer containing an electrically conductive filler and a layer containing at least one of non-conductive fillers and semiconductive fillers.

7. A battery according to claim 1, wherein the battery body is a laminate of a plurality of electrode bodies each consisting of the positive electrode, the adhesive resin layer, and the negative electrode.

8. A battery according to claim 7, wherein
   the laminate of a plurality of electrode bodies comprises a plurality of positive electrodes, a plurality of negative electrodes and a plurality of adhesive resin layers; and
   the plurality of positive electrodes and the plurality of negative electrodes are interposed alternately among the plurality of adhesive resin layers.

9. A battery according to claim 8, wherein the laminate is rolled up.

10. A battery according to claim 8, wherein the laminate is folded.

11. A method of making a battery, the method comprising
    assembling a positive electrode, a negative electrode; an electrolytic solution and an adhesive resin layer in a battery body; and
    forming the battery of claim 1.

12. The battery according to claim 1, wherein the particle size of the filler is not more than 0.1 $\mu$m.

13. A battery according to claim 12, wherein the particle size of the filler is in a range of 0.01 $\mu$m to 0.1 $\mu$m.

14. The battery according to claim 1, wherein the adhesive resin comprises polyvinylidene fluoride homopolymer.

15. The battery according to claim 1, wherein the adhesive resin consists of polyvinylidene fluoride homopolymer.

* * * * *

UNITED STATES PATENT AND TRADEMARK OFFICE
CERTIFICATE OF CORRECTION

PATENT NO. : 6,811,928 B2  Page 1 of 1
APPLICATION NO. : 09/381295
DATED : November 2, 2004
INVENTOR(S) : Shigeru Aihara et al.

It is certified that error appears in the above-identified patent and that said Letters Patent is hereby corrected as shown below:

On the title page, Item (87), the PCT Published Date is incorrect. Item (87) should read:

--(87) PCT Pub. No.: WO99/38224

PCT Pub. Date: Jul. 29, 1999--

Signed and Sealed this

Ninth Day of June, 2009

JOHN DOLL
*Acting Director of the United States Patent and Trademark Office*